United States Patent
Knapp et al.

(10) Patent No.: US 9,266,610 B2
(45) Date of Patent: Feb. 23, 2016

(54) CONTROLLED RANGE AND PAYLOAD FOR UNMANNED VEHICLES, AND ASSOCIATED SYSTEMS AND METHODS

(71) Applicant: Insitu, Inc., Bingen, WA (US)

(72) Inventors: Jeffrey H. Knapp, Hood River, OR (US); David Tasker, Beaverton, OR (US); Gary Lee Viviani, Lyle, WA (US)

(73) Assignee: Insitu, Inc., Bingen, WA (US)

( * ) Notice: Subject to any disclaimer, the term of this patent is extended or adjusted under 35 U.S.C. 154(b) by 0 days.

(21) Appl. No.: 14/278,242

(22) Filed: May 15, 2014

(65) Prior Publication Data

US 2014/0379173 A1    Dec. 25, 2014

Related U.S. Application Data

(63) Continuation of application No. PCT/US2012/065360, filed on Nov. 15, 2012.

(60) Provisional application No. 61/560,234, filed on Nov. 15, 2011.

(51) Int. Cl.
*G05D 1/00* (2006.01)
*B64C 39/02* (2006.01)
(Continued)

(52) U.S. Cl.
CPC .............. *B64C 39/024* (2013.01); *B64C 19/00* (2013.01); *G05D 1/0055* (2013.01); *G06Q 10/10* (2013.01); *G06Q 50/18* (2013.01); *G06Q 50/26* (2013.01); *Y10T 29/49826* (2015.01)

(58) Field of Classification Search
CPC ...... B64C 39/024; B64C 19/00; C06Q 10/10; G06Q 50/18; G06Q 50/26; Y02T 29/49826; G07C 5/008; G07C 5/0841; H04W 4/046

USPC .............. 701/2, 3, 13, 14, 15, 33.4; 340/439; 244/75 R, 158.1; 29/428
See application file for complete search history.

(56) References Cited

U.S. PATENT DOCUMENTS

| | | | |
|---|---|---|---|
| 965,881 A | 8/1910 | Draper | |
| 968,339 A | 8/1910 | Geraldson | |

(Continued)

FOREIGN PATENT DOCUMENTS

| | | |
|---|---|---|
| CN | 1032645 A | 5/1989 |
| DE | 4301671 A1 | 7/1993 |

(Continued)

OTHER PUBLICATIONS

Ames Builds Advanced Yawed-Wing RPV, Aviation Week and Space Technology, Jan. 22, 1973, p. 73.

(Continued)

*Primary Examiner* — Gertrude Arthur Jeanglaude
(74) *Attorney, Agent, or Firm* — Perkins Coie LLP

(57) ABSTRACT

The presently disclosed technology is directed generally to unmanned vehicle systems and methods configured to satisfy a first set of export control regulations, such as those within the jurisdiction of one government entity or international body (e.g., the U.S. Department of Commerce) without falling within the purview of a second set of export control regulations, such as export control regulations within the jurisdiction of another government entity or international body (e.g., the U.S. Department of State). Through limited range of operation, limited payload types, limited capabilities, and tamper-proof or tamper-resistant features, embodiments of the unmanned vehicle system are designed to fall within the purview and under control of one agency and not within the purview and under control of another agency.

17 Claims, 7 Drawing Sheets

(51) Int. Cl.
  *G06Q 10/10* (2012.01)
  *G06Q 50/18* (2012.01)
  *G06Q 50/26* (2012.01)
  *B64C 19/00* (2006.01)

(56) References Cited

U.S. PATENT DOCUMENTS

| | | |
|---|---|---|
| 975,953 A | 11/1910 | Hourwich |
| 1,144,505 A | 6/1915 | Steffan |
| 1,164,967 A | 12/1915 | Thorp |
| 1,317,631 A | 9/1919 | Kinser |
| 1,383,595 A | 7/1921 | Black |
| 1,384,036 A | 7/1921 | Anderson |
| 1,428,163 A | 9/1922 | Harriss |
| 1,499,472 A | 7/1924 | Hazen |
| 1,530,010 A | 3/1925 | Neilson |
| 1,556,348 A | 10/1925 | Ray et al. |
| 1,624,188 A | 4/1927 | Simon |
| RE16,613 E | 5/1927 | Moody et al. |
| 1,634,964 A | 7/1927 | Steinmetz |
| 1,680,473 A | 8/1928 | Parker |
| 1,686,298 A | 10/1928 | Uhl |
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |
| 1,738,261 A | 12/1929 | Perkins |
| 1,748,663 A | 2/1930 | Tucker |
| 1,749,769 A | 3/1930 | Johnson |
| 1,756,747 A | 4/1930 | Holland |
| 1,777,167 A | 9/1930 | Forbes |
| 1,816,976 A | 8/1931 | Kirkham |
| 1,836,010 A | 12/1931 | Audrain |
| 1,842,432 A | 1/1932 | Stanton |
| 1,869,506 A | 8/1932 | Richardson |
| 1,892,357 A | 12/1932 | Moe |
| 1,912,723 A | 6/1933 | Perkins |
| 1,925,212 A | 9/1933 | Steiber |
| 1,940,030 A | 12/1933 | Steiber |
| 1,960,264 A | 5/1934 | Heinkel |
| 2,211,089 A | 8/1940 | Berlin |
| 2,296,988 A | 9/1942 | Endter |
| 2,333,559 A | 11/1943 | Grady et al. |
| 2,342,773 A | 2/1944 | Wellman |
| 2,347,561 A | 4/1944 | Howard et al. |
| 2,360,220 A | 10/1944 | Goldman |
| 2,364,527 A | 12/1944 | Haygood |
| 2,365,778 A | 12/1944 | Schwab |
| 2,365,827 A | 12/1944 | Liebert |
| 2,380,702 A | 7/1945 | Persons |
| 2,390,754 A | 12/1945 | Valdene |
| 2,435,197 A | 2/1948 | Brodie |
| 2,436,240 A | 2/1948 | Wiertz |
| 2,448,209 A | 8/1948 | Boyer et al. |
| 2,465,936 A | 3/1949 | Schultz |
| 2,488,050 A | 11/1949 | Brodie |
| 2,515,205 A | 7/1950 | Fieux |
| 2,526,348 A | 10/1950 | Gouge |
| 2,669,403 A | 2/1954 | Milligan |
| 2,671,938 A | 3/1954 | Roberts |
| 2,735,391 A | 2/1956 | Buschers |
| 2,814,453 A | 11/1957 | Trimble et al. |
| 2,843,342 A | 7/1958 | Ward |
| 2,844,340 A | 7/1958 | Daniels et al. |
| 2,908,240 A | 10/1959 | Hodge |
| 2,919,871 A | 1/1960 | Sorensen |
| 2,933,183 A | 4/1960 | Koelsch |
| 2,954,946 A | 10/1960 | O'Neil et al. |
| 3,069,118 A | 12/1962 | Bernard |
| 3,163,380 A | 12/1964 | Brodie |
| 3,268,090 A | 8/1966 | Wirkkala |
| 3,411,398 A | 11/1968 | Blakeley et al. |
| 3,454,244 A | 7/1969 | Walander |
| 3,468,500 A | 9/1969 | Carlsson |
| 3,484,061 A | 12/1969 | Niemkiewicz |
| 3,512,447 A | 5/1970 | Vaughn |
| 3,516,626 A | 6/1970 | Strance et al. |
| 3,657,956 A | 4/1972 | Bradley et al. |
| 3,672,214 A | 6/1972 | Yasuda |
| 3,684,219 A | 8/1972 | King |
| 3,708,200 A | 1/1973 | Richards |
| 3,765,625 A | 10/1973 | Myhr et al. |
| 3,771,484 A | 11/1973 | Schott et al. |
| 3,827,660 A | 8/1974 | Doolittle |
| 3,939,988 A | 2/1976 | Wellman et al. |
| 3,943,657 A | 3/1976 | Leckie et al. |
| 3,980,259 A | 9/1976 | Greenhalgh et al. |
| 4,067,139 A | 1/1978 | Pinkerton et al. |
| 4,079,901 A | 3/1978 | Mayhew et al. |
| 4,143,840 A | 3/1979 | Bernard et al. |
| 4,147,317 A | 4/1979 | Mayhew et al. |
| 4,149,840 A | 4/1979 | Tippmann |
| D256,816 S | 9/1980 | McMahon et al. |
| 4,236,686 A | 12/1980 | Barthelme et al. |
| 4,238,093 A | 12/1980 | Siegel et al. |
| 4,279,195 A | 7/1981 | Miller |
| 4,296,894 A | 10/1981 | Schnabele et al. |
| 4,296,898 A | 10/1981 | Watson |
| 4,311,290 A | 1/1982 | Koper |
| 4,408,737 A | 10/1983 | Schwaerzler et al. |
| 4,410,151 A | 10/1983 | Hoppner et al. |
| 4,471,923 A | 9/1984 | Hoppner et al. |
| 4,523,729 A | 6/1985 | Frick et al. |
| 4,566,658 A | 1/1986 | DiGiovanniantonio et al. |
| 4,645,142 A | 2/1987 | Soelter |
| 4,653,706 A | 3/1987 | Ragiab |
| 4,678,143 A | 7/1987 | Griffin et al. |
| 4,730,793 A | 3/1988 | Thurber, Jr. et al. |
| 4,753,400 A | 6/1988 | Reuter et al. |
| 4,790,497 A | 12/1988 | Yoffe et al. |
| 4,809,933 A | 3/1989 | Buzby et al. |
| 4,842,222 A | 6/1989 | Baird et al. |
| 4,909,458 A | 3/1990 | Martin et al. |
| 4,979,701 A | 12/1990 | Colarik et al. |
| 4,991,739 A | 2/1991 | Levasseur |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor et al. |
| 5,060,888 A | 10/1991 | Vezain et al. |
| 5,109,788 A | 5/1992 | Heinzmann et al. |
| 5,119,935 A | 6/1992 | Stump et al. |
| 5,176,339 A | 1/1993 | Schmidt |
| 1,909,445 A | 5/1993 | Ahola |
| 5,222,694 A | 6/1993 | Smoot |
| 5,253,605 A | 10/1993 | Collins |
| 5,253,606 A | 10/1993 | Ortelli et al. |
| 5,259,574 A | 11/1993 | Carrot |
| 5,390,550 A | 2/1995 | Miller |
| 5,407,153 A | 4/1995 | Kirk et al. |
| 5,509,624 A | 4/1996 | Takahashi et al. |
| 5,583,311 A | 12/1996 | Rieger et al. |
| 5,603,592 A | 2/1997 | Sadri et al. |
| 5,655,944 A | 8/1997 | Fusselman |
| 5,687,930 A | 11/1997 | Wagner et al. |
| 5,762,456 A | 6/1998 | Aasgaard |
| 5,816,761 A | 10/1998 | Cassatt et al. |
| 5,906,336 A | 5/1999 | Eckstein |
| 6,161,797 A | 12/2000 | Kirk et al. |
| 6,237,875 B1 | 5/2001 | Menne et al. |
| 6,264,140 B1 | 7/2001 | McGeer et al. |
| 6,370,455 B1* | 4/2002 | Larson et al. ............... 701/31.4 |
| 6,371,410 B1 | 4/2002 | Cairo-Iocco et al. |
| 6,416,019 B1 | 7/2002 | Hilliard et al. |
| 6,442,460 B1* | 8/2002 | Larson et al. ............... 701/32.6 |
| 6,457,673 B1 | 10/2002 | Miller |
| 6,478,650 B1 | 11/2002 | Tsai et al. |
| 6,695,255 B1 | 2/2004 | Husain |
| 6,835,045 B1 | 12/2004 | Barbee et al. |
| 7,059,564 B2 | 6/2006 | Dennis |
| 7,066,430 B2 | 6/2006 | Dennis et al. |
| 7,090,166 B2 | 8/2006 | Dennis et al. |
| 7,114,680 B2 | 10/2006 | Dennis |
| 7,121,507 B2 | 10/2006 | Dennis et al. |

(56) References Cited

U.S. PATENT DOCUMENTS

| | | |
|---|---|---|
| 7,128,294 B2 | 10/2006 | Roeseler et al. |
| 7,140,575 B2 | 11/2006 | McGeer et al. |
| 7,143,974 B2 | 12/2006 | Roeseler et al. |
| 7,152,827 B2 | 12/2006 | McGeer |
| 7,155,322 B2 * | 12/2006 | Nakahara et al. ............ 701/33.4 |
| 7,165,745 B2 | 1/2007 | McGeer et al. |
| 7,175,135 B2 | 2/2007 | Dennis et al. |
| 7,219,856 B2 | 5/2007 | Watts et al. |
| 7,259,357 B2 | 8/2007 | Walker |
| 7,264,204 B1 | 9/2007 | Portmann |
| 7,410,125 B2 | 8/2008 | Steele |
| 7,422,178 B2 | 9/2008 | DeLaune |
| 7,578,467 B2 | 8/2009 | Goodrich |
| 7,686,247 B1 | 3/2010 | Monson et al. |
| 7,748,661 B2 | 7/2010 | Harris et al. |
| 7,798,445 B2 | 9/2010 | Heppe et al. |
| 7,806,366 B2 | 10/2010 | Jackson |
| 8,136,766 B2 | 3/2012 | Dennis |
| 8,313,057 B2 | 11/2012 | Rednikov |
| 2002/0011223 A1 | 1/2002 | Zauner et al. |
| 2002/0100838 A1 | 8/2002 | McGeer et al. |
| 2003/0116107 A1 | 6/2003 | Laimbock |
| 2003/0122384 A1 | 7/2003 | Swanson et al. |
| 2003/0222173 A1 | 12/2003 | McGeer et al. |
| 2005/0187677 A1 | 8/2005 | Walker |
| 2006/0006281 A1 | 1/2006 | Sirkis |
| 2006/0091258 A1 | 5/2006 | Chiu et al. |
| 2006/0102783 A1 | 5/2006 | Dennis et al. |
| 2006/0249623 A1 | 11/2006 | Steele |
| 2006/0271251 A1 | 11/2006 | Hopkins |
| 2008/0156932 A1 | 7/2008 | McGeer et al. |
| 2008/0191091 A1 | 8/2008 | Hoisington et al. |
| 2009/0224097 A1 | 9/2009 | Kariv |
| 2009/0294584 A1 | 12/2009 | Lovell et al. |
| 2010/0318475 A1 | 12/2010 | Abrahamson |

FOREIGN PATENT DOCUMENTS

| | | |
|---|---|---|
| DE | 19602703 A1 | 2/1997 |
| EP | 0742366 A1 | 11/1996 |
| FR | 854371 | 4/1940 |
| GB | 2 080 216 A | 2/1982 |
| GB | 2093414 A | 9/1982 |
| GB | 2 150 895 A | 7/1985 |
| GB | 2 219 777 A | 12/1989 |
| IL | 76726 | 1/1991 |
| JP | 07-304498 | 11/1995 |
| JP | 2008540217 A | 11/2008 |
| WO | WO-00/75014 A1 | 12/2000 |
| WO | WO-01/07318 A1 | 2/2001 |
| WO | WO-2008015663 A1 | 2/2008 |
| WO | WO-2011066400 | 6/2011 |

OTHER PUBLICATIONS

Article: Robinson: R. Robinson, "Dynamic Analysis of a Carousel Remotely Piloted ; Vehicle Recovery System," 1977, Naval Post-Graduate School Master's Thesis, No. ADA052401, 70 pages.

Article: Stephen A. Whitmore, Mike Fife, and Logan Brashear: "Development of a Closed-Loop ; Strap Down Attitude System for an Ultrahigh Altitude Flight Experiment," Jan. 1997, NASA Technical Memorandum 4775, 31 pages.

Study: US Army: H. E. Dickard, "Mini-RPV Recovery System Conceptual Study," Aug. 1977, Contract DA4J02-76-C-0048, Report No. USAAMRDL-TR077-24.

Phillips, K.; "Alternate Aquila Recovery System Demonstration Recovery System Flight Test;" Final Report; Jan. 19, 1977; 67 pages.

International Search Report and written Opinion for International Patent Application No. PCT/US2012/065360, Applicant: Insitu, Inc., mailed Feb. 21, 2013, 10 pages.

Supplementary European Search Report for European Patent Application No. 12849894.6, Applicant: Insitu, Inc., mailed Oct. 30, 2015, 9 pages.

* cited by examiner

CONTROLLED RANGE AND PAYLOAD FOR UNMANNED VEHICLES, AND ASSOCIATED SYSTEMS AND METHODS

CROSS-REFERENCE TO RELATED APPLICATIONS

The present application is a continuation of International Patent Application No. PCT/US12/65360, filed Nov. 15, 2012, entitled CONTROLLED RANGE AND PAYLOAD FOR UNMANNED VEHICLES, AND ASSOCIATED SYSTEMS AND METHODS, which claims the benefit of U.S. Provisional Patent Application No. 61/560,234, filed Nov. 15, 2011, entitled CONTROLLED RANGE AND PAYLOAD FOR UNMANNED VEHICLES, AND ASSOCIATED SYSTEMS AND METHODS, each of which is incorporated by reference in its entirety. To the extent the foregoing application or any other material incorporated herein by reference conflict with the present disclosure, the present disclosure controls.

BACKGROUND

Unmanned systems (e.g., unmanned aerial or aircraft systems, unmanned ground systems, unmanned underwater systems) provide a low-cost and low-risk alternative to a variety of reconnaissance-type tasks performed by manned systems. Unmanned aircraft systems, for example, are used by TV news stations, by the film/television industry, the oil industry, for maritime traffic monitoring, border/shore patrol, civil disaster surveillance, drug enforcement activities, monitoring fleets of fish (e.g., tuna), etc. Law enforcement agencies use manned helicopters and airplanes as an integral part of their operations, but unmanned aircraft systems are starting to be used in a growing number of places. The uses for aviation equipment in law enforcement that can be filled by unmanned aerial systems include, for example:

Photographic uses,
Surveillance uses,
Routine patrol/support,
Fugitive searches,
Search and Rescue,
Pilot Training,
Drug Location/Interdiction,
SWAT operations, and
Firefighting/Support.

Table 1 provides statistics related to the use of aviation units by large law enforcement agencies with one hundred or more full time officers in the United States.

TABLE 1

Aviation Law Enforcement Statistics

| Number of aviation units, US | | 2010 |
|---|---|---|
| Rotary - median $/flt.hr. | $168 (Maintenance) | $45 (Fuel) |
| Fixed - median $/flt.hr. | $54 (Maintenance) | $74 (Fuel) |
| Unmanned | | $1.79/hour |

Unmanned systems can include a Global Positioning System (GPS) receiver to obtain adequate near real time position data to know where the system is, and calculate attitude with feedback information from solid-state rate gyros. Unmanned aerial systems capable of, for example, automated take-off/ launch, flight via programmed way-points, and snag-type recovery have been developed that reduce the cost to own and operate when compared to human-operated aircraft (e.g., single-pilot fixed and rotor aircraft). Unmanned vehicles that are covered by the United States Munitions List (USML) are subject to export controls administered by the U.S. Department of State under the Arms Export Control Act and the International Traffic in Arms Regulations (ITAR) defined at 22 C.F.R. §§120-130. For example, the Missile Technology Control Regime ("MTCR") (See 22 C.F.R. §121.16) defines two categories of unmanned air vehicles subject to State Department Control, each category subject to different export controls. "MTCR Category I" vehicles are those vehicles that 1) are capable of at least 300 km of autonomous flight and navigation and 2) can carry a payload of at least 500 kg. "MTCR Category II" vehicles are those vehicles that either 1) are capable of at least 300 km of autonomous flight and navigation or 2) can carry a payload of at least 500 kg. (See 22 C.F.R. §121.16 (2011).) Commodities subject to export controls administered by other agencies (e.g., the U.S. Department of Commerce), such as unmanned air vehicles that are incapable of autonomous flight and navigation for 300 km or more and cannot carry a payload of 500 kg or more, are subject to less stringent export requirements.

DETAILED DESCRIPTION

Figure 1:
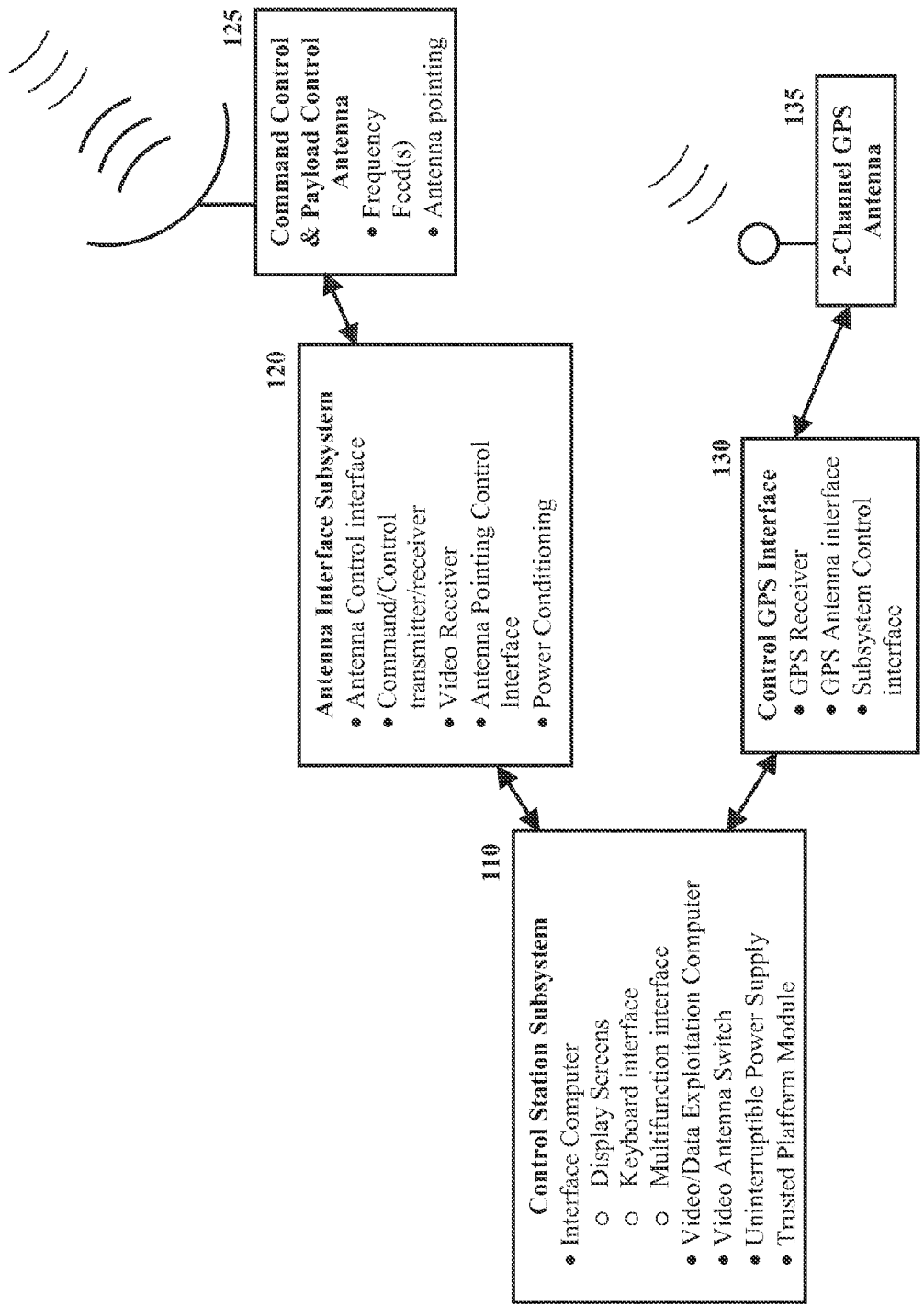
FIG. 1 is a block diagram illustrating a control station configured in accordance with an embodiment of the disclosure.

The presently disclosed technology is directed generally to unmanned vehicle systems and methods configured to satisfy certain restrictions. For example, the systems and methods can satisfy Commerce Department jurisdiction requirements without falling within the purview of State Department control. Through limited range of operation, limited payload types (e.g., surveillance equipment, munitions, insecticides or other materials for agricultural crops) and capabilities, and tamper-proof or tamper-resistant features, embodiments of the unmanned vehicle system are designed to fall within the purview and under control a first set of export control regulations or requirements, such as Export Administration Regulations ("EAR") overseen by the U.S. Commerce Department, and not within the purview and under control of a second set of export control regulations or requirements, such as MTCR, ITAR, and other State Department control thresholds. Disclosed techniques in accordance with particular embodiments provide protection against repurposing a vehicle as a weapons delivery device and repurposing a commercial vehicle for military or other operations by, for example, modifying operation of the vehicle (e.g., preventing vehicle systems from executing, preventing the vehicle from launching, preventing the vehicle's engine from starting) in response to detecting these conditions. Representative techniques can also provide protection against in-flight handoff between ground controlling authorities, eavesdropping of available data streams, and so on by, for example, restricting use of commands for performing these functions. Although this disclosure discloses particular embodiments in the context of Category II vehicles by way of example, one skilled in the art will recognize that the disclosed techniques may be applied to Category I vehicles in addition to other vehicles or commodities that may be subject to varying sets of requirements.

I. System Design and Capabilities

In some embodiments, the unmanned vehicle has a low payload capability of 3.3 lbs., (1.5 Kg), a diameter of 7 inches, a length of 42 inches, a wingspan of 10 feet, an empty weight of 26 lbs, and a gross takeoff weight of 40 lbs. Furthermore, the unmanned vehicle's design and capabilities are based on its airframe structure electronics systems and software architecture, which includes trusted computing technologies, and are described in further detail below.

A. Airframe Structure

In certain embodiments, the aircraft structure, which comprises the fuselage, main wing box, wing skin sandwich panels, winglets, fuel tank, and internal brackets, is fabricated using, for example, low cost carbon fiber/epoxy materials, fiberglass, aluminum, or molded plastics based on considerations of size, weight, power, cost, etc. and hard-tool molding commercial techniques. Such techniques have been used in, for example, bicycle frame, snow-sport and water-sport equipment manufacturing.

B. Command and Control System and Software

1. Command and Control System

In certain embodiments, the electronic hardware and software of the unmanned vehicle are configured to limit range (distance from designated point, such as a point of origin or launch location), but not necessarily endurance (total distance traveled during a flight). For example, the range can be limited to 60 nautical miles from the operator control station (e.g., ground control base station or mobile control base station) using a radio transmitter and antenna gain combination that limits the maximum physical range of communication for the provided radio link on the aircraft to the control station antenna. Flight operation limits can be achieved through the physical limits of radio frequency command and control wireless data links coupled with software commands that prevent waypoint entry beyond the radial distance of 60 nautical miles. For example, aircraft mission management software can be configured to compare control station GPS location to aircraft GPS location to maintain radio-link margin distance at all times. In the case of a lost data or communication link, the aircraft can alter course to regain the lost data or communication link with a control station. If link interruption continues, the aircraft can return to the last known GPS position of the control station to execute flight termination or emergency landing procedures. In this embodiment, travel of the unmanned vehicle beyond 60 nautical miles causes the auto pilot to steer the unmanned vehicle toward the control station GPS location to secure communication. The software may also be configured to limit the range of the unmanned vehicle or return to base at or below the 299 km distance from a launch location to meet MTCR requirements.

a. Navigation System

In some embodiments, to limit the operation of the unmanned vehicle, the unmanned vehicle is not equipped with a magnetic compass or accelerometers to estimate current altitude, speed, and direction. Instead, the unmanned vehicle can be equipped with a rudimentary navigation system. Without adequate GPS data, the unmanned vehicle cannot maintain a known navigation solution and will attempt to return to the control station or terminate travel based on one or more emergency procedure protocols known to those of ordinary skill in the art. For example, in the case of lost communications and/or lost GPS connectivity, the unmanned vehicle can deploy speed-reducing devices (e.g., parachutes or parafoils) and/or airbags and execute a spin-stall maneuver, causing the aircraft to tumble as slowly as possible to the ground. The unmanned vehicle's navigation protocol and emergency procedures are designed to prevent flight beyond the 60 nautical mile range of the Command and Control system. The unmanned vehicle may typically fly over uninhabited terrain at altitudes below 5,000 feet above the ground, thereby reducing the probability of human injury. The unmanned vehicle can be configured to tumble out of the sky using automatic auto rotation and/or automatic chute deployment in the case of lost communications and/or lost GPS connectivity.

In other embodiments, a collection of multiple control stations are available for communication with the unmanned vehicle system. For example, environment conditions (e.g., obstructions to line of sight) and communication systems may prevent the unmanned vehicle system from communicating with control stations beyond a certain distance, such as 60 nautical miles. In these embodiments, control stations and the unmanned vehicle system can perform a handoff procedure as the unmanned vehicle system approaches a specified distance (e.g., 60 nautical miles) from the control station with which the unmanned vehicle system is communicating to another control station so that the unmanned vehicle system can maintain control station connectivity and take advantage of a greater permissible range, such as 299 km from a launch location. The handoff procedure may be based on, for example, the type of vehicle and control station involved, the speed and/or direction of the vehicle and/or control station, the launch location or target of the vehicle, and so on. In this manner, the range of the unmanned vehicle can approach the "299 km from launch location" limit discussed above. However, embodiments of the system will prevent the aircraft from flying beyond the "299 km from launch location" limit discussed above. Furthermore, the aircraft can be configured to set a transponder to squawk an emergency code if the aircraft is approaching the edge of a navigation restriction zone or is within a predetermined distance (e.g., ten feet, 2000 feet, or one mile) from the edge.

In some embodiments, the unmanned vehicle system is configured to prevent flight beyond 60 nautical miles from the control station (e.g., ground control station) and/or 299 km from a launch location at least in part by:

establishing and confirming location of the Control Station, maintaining an autopilot navigation solution without a GPS solution and switching to an Emergency Response Procedure, such as changing course to "dead reckon" toward the control station, maintaining level flight until a flight termination timer expires, executing a spin-stall maneuver to slowly descend from the sky, or establishing a GPS-based navigation solution, limiting the Command & Control Data Link RF communication between the aircraft radio transmitter and the associated send/receive antenna for the control station. In the event that communication is lost, the unmanned vehicle will attempt to navigate toward the last known GPS coordinate location of the control station to achieve connection. If connection is not re-established, the unmanned vehicle will automatically navigate back to a predefined GPS location within 3 nautical miles of the control station for emergency landing.

Hard coded data entry configured to:
 control emergency landing location to within, for example, 3 nautical miles of the control station,
 prevent "hand-off" to alternate control stations, and
 prevent way-point entry beyond a 60 nautical mile radius of the GPS coordinates for the control station.

b. Control Station and Unmanned Vehicle

In some embodiments, the control station and unmanned vehicle comprise computers, video monitors, hobby-market controllers for radio controlled hobby vehicles, keyboards, track-ball mouse, power cables and connectors and associated software.

In some embodiments, the control station and unmanned vehicle utilize Trusted Computing Group technologies modeled after implementations developed under the NSA High Assurance Platform (HAP) Program (see http://www.nsa.gov/ia/programs/h_a_p/index.shtml). The unmanned vehicle can use Trusted Platform Module (TPM) security chips, such as those provided by Infineon Technologies AG, that attest to or confirm the identity of the control station and the aircraft computer's identity and further confirm the integrity of the software running on each. Furthermore, computers within the unmanned vehicle system can use, for example, a National Institute of Standards and Technology (NIST) verified Trusted Operating System utilizing Trusted Boot to measure and attest to the boot measurements (e.g., system configuration measurements and diagnostics made at boot time) when appropriate. Remote confirmation verifies software state on client and remote machines. Trusted Computing technologies confirm that the unmanned vehicle is operating as expected based on its design (e.g., only authorized software is running on the vehicle) to ensure that the unmanned vehicle system remains compliant with Commerce Department export control requirements.

Trusted Computing technologies allow the unmanned vehicle to verify the integrity of sub-system components relative to initial configuration information. For example, at boot-time or during operation, a trusted component of the unmanned vehicle can verify that the unmanned vehicle is configured as originally designed by querying the various components for their identification and current configuration information. In this manner, the unmanned vehicle can ensure that it is equipped with components that do not render the unmanned vehicle subject to State Department export control. For example, system devices (avionics, radios, transponder, integrated flight controller, ground control station, etc.) are configured to include a software module and/or a hardware module that can publish an identification of that device and can certify identifications from some other device. In other words, one cannot, for example, swap in military mission components subject to ITAR control without causing system failures and rendering the system inoperable because the swapped-in components will have different identifications than the components of the vehicle in its initial configuration and the vehicle will not be permitted to, for example, operate, launch, accept input commands, transmit data, etc. Accordingly, an unmanned vehicle constructed and equipped to comply with Commerce Department export control requirements can be rendered inoperable after modification. In some embodiments, the unmanned vehicle may send a communication to a ground control station or satellite in response to determining that its configuration has changed.

In some embodiments, the unmanned vehicle includes a commercial Advanced Encryption Standard (AES)-256 Encrypted data interface in the onboard electronics and all data links between the unmanned vehicle and the control station. Encrypted data protocols will allow operators to maintain configuration control and limit device connection with specific encryption keys controlled by a central authority.

c. Tampering Prevention

In some embodiments, the hardware and software of the unmanned vehicle system are designed to prevent and/or detect tampering and provide security to the system. Trusted Platform Module (TPM) technology to be used in the unmanned vehicle system (e.g., Infineon Technologies, TPM Chip SLB9635T1.2, ECCN 5A992, TPM Professional Package (Software), ECCN 5D002) is controlled by the Commerce Department. In some embodiments, the unmanned vehicle may send a communication to a ground control station or satellite in response to detecting tampering. Design elements include, for example:

An Avionics Module containing: a) the commercial GPS receiver (e.g., Novetel OEMV-2-L1L2 GPS-ECCN No. 7A994); b) an Auto Pilot computer; and c) a regulated power conditioning system. These components can be factory sealed in the Avionics Module to prevent tampering. Data communication to and from the Avionics Module requires matching encryption keys to function. The avionics are factory—programmed using specific compiled code and Trusted Platform Module encryption techniques.

The Avionics Module is capable of factory-only programming and encryption key configuration. Updates to the software are limited to factory only upgrades of the Avionics Module.

For an unmanned aircraft, a tail-less design prevents over-flight weight or aircraft length modifications due to the physical limitation of flight envelope (Bernoulli principle). Without proper updates to the autopilot, stable flight is typically impossible within 30 seconds to 2 minutes. The time elapsed between stable and non-stable flight will depend on localized atmospherics, how much integration error the aircraft attitude algorithm has accumulated at the time the GPS is turned off, and the actual maneuver the aircraft is performing at the moment the GPS is turned off. For example, navigation direction is lost immediately when the aircraft does not have an on-board compass and GPS provides the only reference to Earth.

Sensors for the unmanned vehicle may include, for example, EAR99 (i.e., subject to Commerce Department export control) Electro-optical sensors to a commercial Sony Handycam®, LongWave Infrared Sensors, such as the Goodrich Aerospace Short Wave Infrared (SWIR).

2. Software

In some embodiments, the software of the unmanned vehicle system is written using C++ industry standard commercial language and development methodology. A modular system architecture allows feature sets of the vehicle control or control station software to be removed before compiling at the factory. Removal of features sets for the software assures the system operation is limited to the desired feature set. The feature set specific to the unmanned vehicle will be modules that are left out or added in when code is compiled and no source code or variable settings/switches will be available to the user. Moreover, human-readable characters may be removed from the code using, for example, a pre-parser.

Further, the code may be subjected to obfuscation techniques or programs (See, e.g., www.preemptive.com/products/dotfuscator/overview).

In some embodiments, delivered unmanned vehicle hardware does not include programmable devices. Software and hardware upgrades to the unmanned vehicle are accomplished by delivering new hardware from the factory. Software and hardware features are limited to factory delivered configuration through the use of Trusted Computing technologies.

The control station hardware includes commercial off-the-shelf work stations and laptops using, for example, the MICROSOFT WINDOWS® operating system, which is recognized by industry as a trusted operating system allowing complete implementation of the Trusted Computing strategy applied to the unmanned vehicle system.

3. Representative Design Features:

Table 2 below identifies representative design features for several subsystems of an aircraft system configured in accordance with embodiments of the present technology.

TABLE 2

| | |
|---|---|
| Navigation: | |
| Range Restriction - ROM Chip | Prevent vehicle from flying outside of a Latitude/Longitude box and prevent user from modifying the Latitude/Longitude box by, for example, burning the Latitude/Longitude box into a ROM chip. |
| Range Restriction - Expanding Box | Prevent vehicle from flying outside of an expandable Latitude/Longitude box and prevent user from modifying the Latitude/Longitude box beyond a certain size. |
| Reduced Navigation Accuracy | Limit the accuracy of the navigation system. |
| Flight Termination on High Speed | Disable navigation system if vehicle exceeds a predetermined speed. |
| Limited Speed | Prevent indicated airspeed from exceeding a defined threshold. |
| Server-Validated Flight Plans | Software validates flight commands (flight plans, orbits, and recovery definitions) through a home server. The data is sent to the server, if it passes a given set of criteria it is encrypted with a Private Key and returned, requiring decryption with, for example, a public key. |
| Approved Flight Box | A combination of the Latitude/Longitude box restriction and the Public/Private Key challenge and response. |
| Time Limited Approvals (Expiration) | A combination of any of the Pub/Private key schemes, but the response has a time limit encoded into it. After the time limit expires, it will no longer be accepted. |
| Minimum Height Above Terrain | Software will not command flight less than a predetermined altitude above the ground level (e.g., 200 ft) as reported by Digital Terrain Elevation Data (DTED). |
| Flight Termination on Engine Out | Command a flight termination at current location if engine is not running. |
| Flight Termination on Low Altitude | A combination of the DTED restriction and the engine out flight termination. |
| Homecoming -- Near Launch Location | Prevent a change to the home coming route if the terminal point is more than a predetermined distance from the launch location (e.g., 50 nautical miles). |
| COMMUNICATION: | |
| Unique Radios | Use radios which are not compatible with radios used in a vehicle subject to ITAR control (or other regulations). |
| PAYLOADS: | |
| Payload Weight Restrictions | Prevent operation if mass and center of gravity change. |
| Video to Fly | Prevent operation if proper video signal is not detected because, for example, a video recorder has been removed. |
| DECODING/DATA ASSURANCE: | |
| Potting Simplified Avionics | The entire avionics unit is converted to single board and then potted, so as to make it impossible to add/remove/decode/modify any parts to unit. |
| Anti-Tamper -- Avionics | Any attempt to disassemble a section of the vehicle breaks it. Frangible connectors. |
| Anti-tamper -- Elec Discharge | Any attempt to disassemble a section of the vehicle breaks it. Charged capacitors that discharge into ICs if not opened correctly. |
| No Payload -- Foam Fill | Empty spaces in the vehicle are filled with unremovable foam/goo (so there is no place to add explosives). |
| Removed Screens | Screens deemed unnecessary are hidden. |
| Single Programming -- All | Prevent reprogramming of executables/param files in the field (e.g., burn once NVRAM). |
| HARDWARE/SYSTEM INTEGRITY: | |
| Proprietary Connectors | Use proprietary (or difficult-to-find/acquire) connectors to make it difficult to add/swap part. |
| Anti-Tamper -- Unreadable FLASH | Use hardware that prevents user from reading NVRAM/FLASH data (e.g., MPC-555). |

C. General Electronics

In some embodiments, electronics used in the unmanned vehicle system include those derived from U.S. industrial and vehicle grade components. For example, an auto-pilot system of the unmanned vehicle may include the Motorola/Freescale 555 processor, a widely used microprocessor in the automotive industry.

1. Circuit Cards

Circuit cards of the unmanned vehicle system can be designed by using IPC standard design and manufacturing standards commonly applied by the U.S. industry.

2. Propulsion System

The propulsion system of the unmanned vehicle can be based on publicly-available hobby aircraft 2-stroke technology (e.g., available 3W-Modellmotoren GmbH (3W Modern Motors) of Rodermark, Germany), commercially-available electric motor systems, commercially-available battery and/or fuel cell technologies, etc.

3. Generator

The electrical power system (e.g., the generator) of the unmanned vehicle can include, for example, a brushless electric motor, such as a Kollmorgen industrial brushless electric motor (EAR99) available from Kollmorgen of Radford, Va. or a Kollmorgen authorized distributor.

II. Export Control Analysis

MTCR & ITAR

The disclosed unmanned vehicle is designed with limited capability so that it will not meet ITAR-control threshold criteria (e.g., range equal to or greater than 300 km), thereby not reaching the minimum threshold for State Department export control, thereby falling within the purview of and under control of the U.S. Commerce Department export control regulations.

As described in Section I, specific safeguards have been put in place to protect concerns of National Security and U.S. government military technologies. In particular embodiments, such safeguards, which were described in more detail in Section I, include:

Range Limited to less than 300 Km—The software and hardware will limit flight range to less than 300 Km from point of origin.

Trusted Computing Technologies—Tamper-proof and/or tamper-resistant technologies (endorsed by NIST) to maintain the as-delivered configuration of the unmanned vehicle and control station.

Commerce Controlled Components—Components of the unmanned vehicle and control station are traced to EAR control requirements (Commerce Depart export control).

Aircraft Limited Payload Capacity—The design and configuration of the aircraft limit payload capacity to less than 2 kilograms in particular embodiments.

One feature of embodiments of the present technology is that by constructing the unmanned vehicle without ITAR-controlled components and military capability, the unmanned vehicle will not require compliance with the ITAR controls for items covered under Category VIII of the U.S. Munitions List. Rather, the unmanned vehicle is designed to be controlled under the Commerce Control List (CCL), such as Export Control Classification Number (ECCN) 9A012, which covers non-military "unmanned aerial vehicle" (UAV) with Missile Technology (MT) and National Security (NS) reasons for control. An advantage of this feature is that it can expand commercial use of the vehicle without creating compliance issues with national security regulations. Many of the techniques used to implement this feature are directly contrary to features designed into conventional vehicles and in particular, conventional aircraft. For example, typical conventional aircraft are designed to maximize payload capacity and/or range while embodiments of the present technology are designed to deliberately limit either or both of the foregoing technical features and/or other technical features.

The computing devices on which the disclosed techniques may be implemented can include a central processing unit, memory, input devices (e.g., keyboard and pointing devices), output devices (e.g., display devices), and storage devices (e.g., disk drives). The memory and storage devices are computer-readable storage media that may be encoded with computer-executable instructions that implement the technology, which means a computer-readable storage medium that stores the instructions. In addition, the instructions, data structures, and message structures may be transmitted via a computer-readable transmission medium, such as a signal on a communications link. Thus, "computer-readable media" includes both computer-readable storage media for storing and computer-readable transmission media for transmitting. Additionally, data used by the facility may be encrypted. Various communications links may be used, such as the Internet, a local area network, a wide area network, a point-to-point dial-up connection, a cell phone network, wireless networks, and so on.

The disclosed technology may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments, including cloud-based implementations.

Many embodiments of the technology described herein may take the form of computer-executable instructions, including routines executed by a programmable computer. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display, LCD, LED display, OLED display, and so on.

The technology can also be practiced in distributed environments, where tasks or modules are performed by remote processing devices linked through a communications network. In a distributed computing environment, program modules or subroutines may be located in local and remote memory storage devices. Aspects of the technology described herein may be stored or distributed on computer-readable media, including magnetic or optically readable or removable computer disks. Furthermore, aspects of the technology may be distributed electronically over networks. Data structures and transmissions of data particular to aspects of the technology are also encompassed within the scope of the technology.

FIG. 1 is a block diagram illustrating a control station configured in accordance with particular embodiments. In this example, the control station includes a control station subsystem 110 communicatively-coupled to an antenna interface subsystem 120 and a control GPS interface 130. The control station subsystem 110 includes a video/data exploitation computer, a video antenna switch, an uninterruptible power supply (UPS), a trusted platform module, and an interface computer comprising one or more display screen(s), a keyboard interface, and a multifunction interface. The antenna interface subsystem 120, which is communicatively coupled to a command control and payload control antenna 125, includes an antenna control interface, a command/control transmitter/receiver, a video receiver, an antenna pointing control interface, and a power conditioning module. The command control and payload control antenna 125 includes frequency feed(s) and antenna pointing actuator(s). The control GPS interface 130 includes a GPS receiver, a GPS antenna interface, and a subsystem and control interface, and is communicatively coupled to a 2-channel GPS antenna 135.

Figure 2:
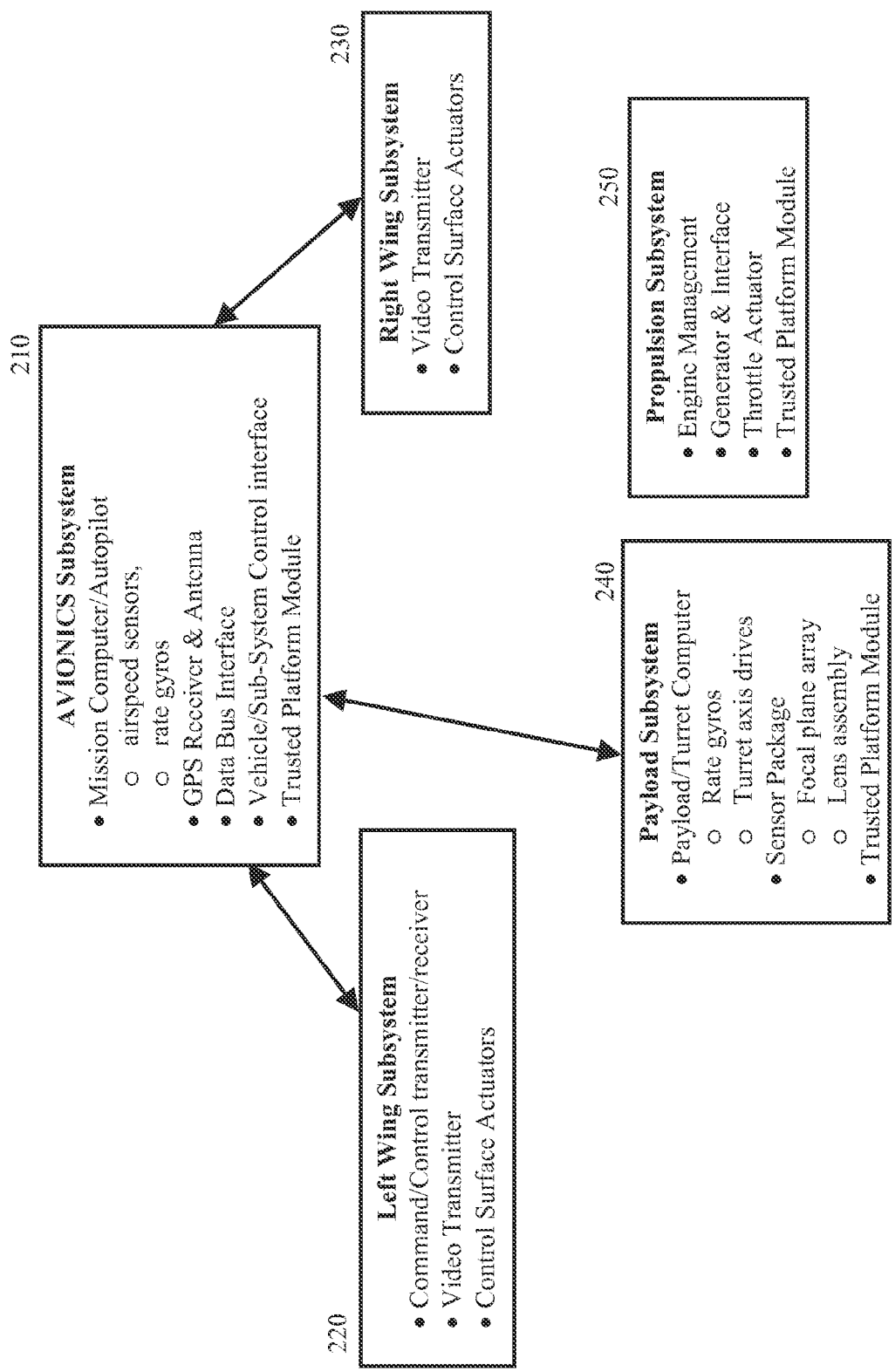
FIG. 2 is a block diagram illustrating subsystems of an unmanned aerial vehicle configured in accordance with an embodiment of the disclosure.

FIG. 2 is a block diagram illustrating subsystems an unmanned aerial vehicle configured in accordance with particular embodiments. In this example, the unmanned aerial vehicle includes an avionics subsystem 210 communicatively coupled to a left wing subsystem 220, a right wing subsystem 230, a payload subsystem 240, and a propulsion subsystem 250. The avionics subsystem 210 includes a GPS receiver and antenna, a data bus interface, a vehicle/subsystem control interface, a trusted platform module, and a mission computer/autopilot comprising airspeed sensors and rate gyros. The left wing subsystem 220 includes a command/control transmitter/receiver, a video transmitter, and control surface actuators. The right wing subsystem 230 includes a video transmitter, and control surface actuators. The payload subsystem 240 includes a payload/turret computer comprising rate gyros and turret axis drives, includes a sensor package comprising a focal plane and a lens assembly, and includes a trusted platform module. The propulsion subsystem 250 includes an engine management module, a generator and related interface, a throttle actuator, and a trusted platform module.

Figure 3:
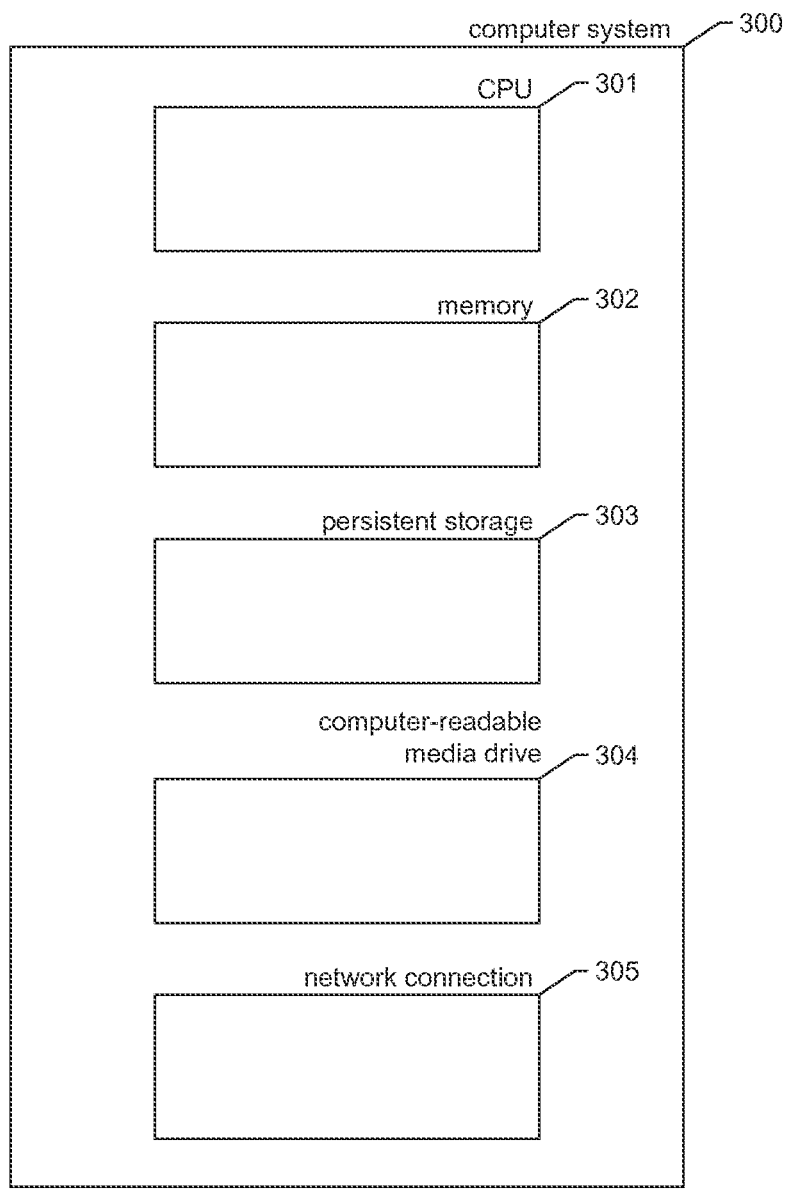
FIG. 3 is a block diagram showing some of the components incorporated in associated computing systems in accordance with an embodiment of the disclosure.

FIG. 3 is a block diagram showing some of the components incorporated in associated computing systems in some embodiments. Computer system 300 comprises one or more central processing units ("CPUs") 301 for executing computer programs; a computer memory 302 for storing programs and data while they are being used; a persistent storage device 303, such as a hard drive for persistently storing programs and data; a computer-readable media drive 304, such as a CD-ROM drive, for reading programs and data stored on a computer-readable medium; and a network connection 305 for connecting the computer system to other computer systems, such as via the Internet. While computer systems configured as described above are suitable used to support the operation of the disclosed technology, those skilled in the art will appreciate that the techniques may be implemented using devices of various types and configurations. Moreover, communications to and from the CPU and on data buses and lines can be encrypted to protect against snooping of internal data.

Figure 4:
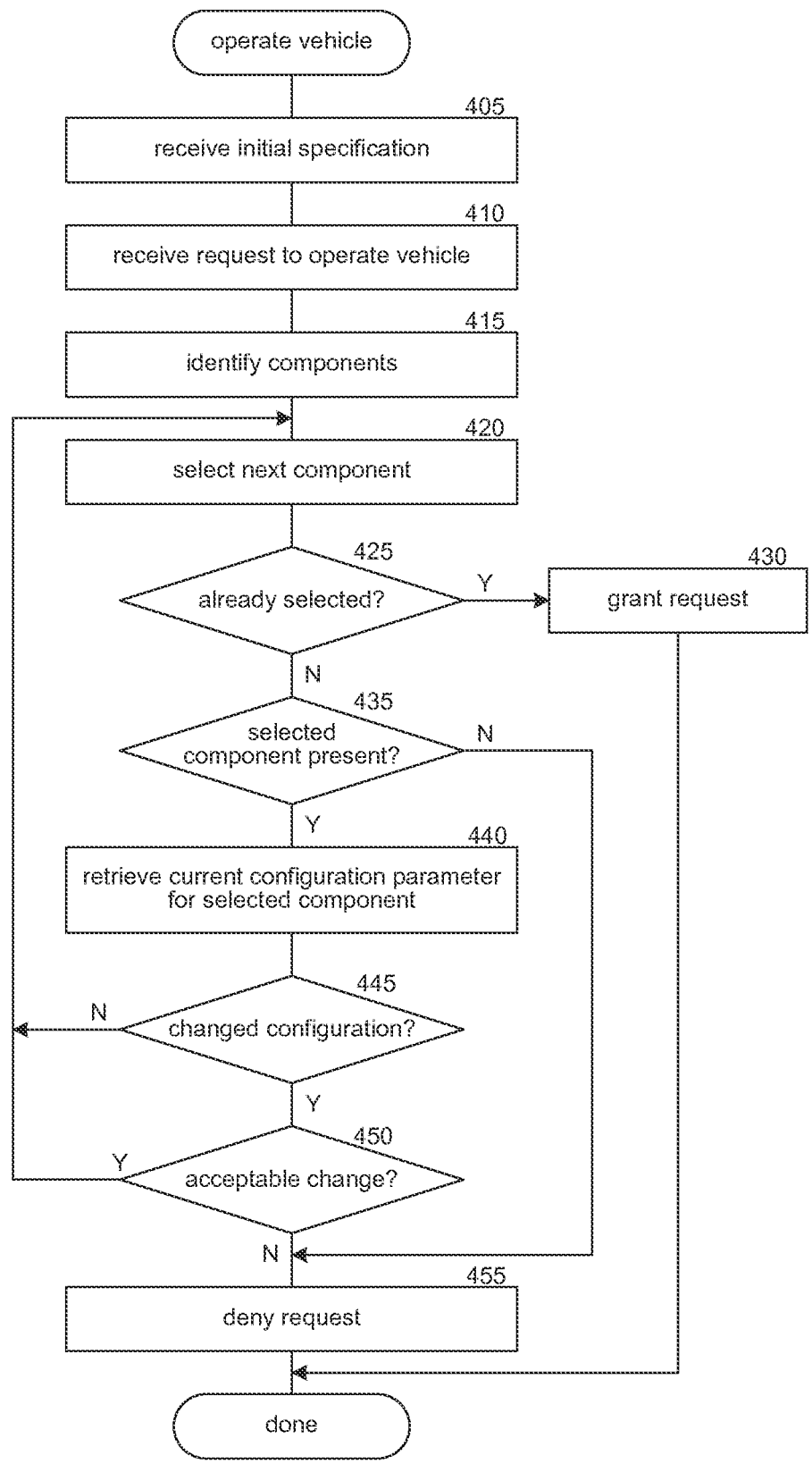
FIG. 4 is a flow diagram illustrating the processing of an "operate vehicle module" configured in accordance with particular embodiments of the disclosure.

FIG. 4 is a flow diagram illustrating the processing of an "operate vehicle module" configured in accordance with particular embodiments of the disclosed technology. The module is invoked to perform vehicle operations based on an initial specification for a vehicle and the current configuration of the vehicle and its installed components. In block 405, the module receives an initial specification for the vehicle. The initial specification may include a list of all components installed on the vehicle and their state or configuration at the time of installation or delivery. For each installed component, the specification can include an indication of whether the component must be present to perform a particular operation. The initial specification may be encrypted and can be installed by the vehicle manufacturer or another party e.g., an explicitly authorized party. In block 410, the module receives a request to operate the vehicle, such as a request to change the speed of the vehicle, a request to modify a planned route for the vehicle (e.g., add or remove a waypoint from a flight plan), a request to change the direction of travel of the vehicle, and/or other requests. In block 415, the module identifies those components that must be present for the request to be granted by, for example, analyzing the initial specification. In block 420, the module loops through each of the identified components to determine whether they are present and properly configured. In decision block 425, if the component has already been selected then processing continues at block 430, else the module continues at decision block 435. In decision block 435, if the selected component is present, then the module continues at block 440, else the module continues at block 455. In block 440, the module retrieves the current configuration information for the selected component. In decision block 445, if the current configuration information for the selected component is different from the configuration information specified in the initial specification, then the module loops back to block 420 to select the next component, else the module continues at decision block 450. In decision block 450, if the change is acceptable then the module loops back to block 420 to select the next component, else the module continues at block 455. For example, if the initial specification indicates that an acceptable payload is 1.4 kg+/−0.2 kg and the payload has changed from 1.3 kg to 1.5 kg, the module will determine this change to be acceptable. In this manner, the module can determine whether a current configuration for a vehicle is consistent with an initial configuration of the vehicle in determining whether to grant or deny a request. In block 430, the module grants the request, thereby allowing the requested operation to occur and then completes processing. In block 455, the module denies the request and then completes processing. In some cases, the module may perform additional actions when denying a request, such as sending out an emergency signal, sending a notification to a ground control station or another vehicle, safely rendering the vehicle inoperable, and so on.

Figure 5A:
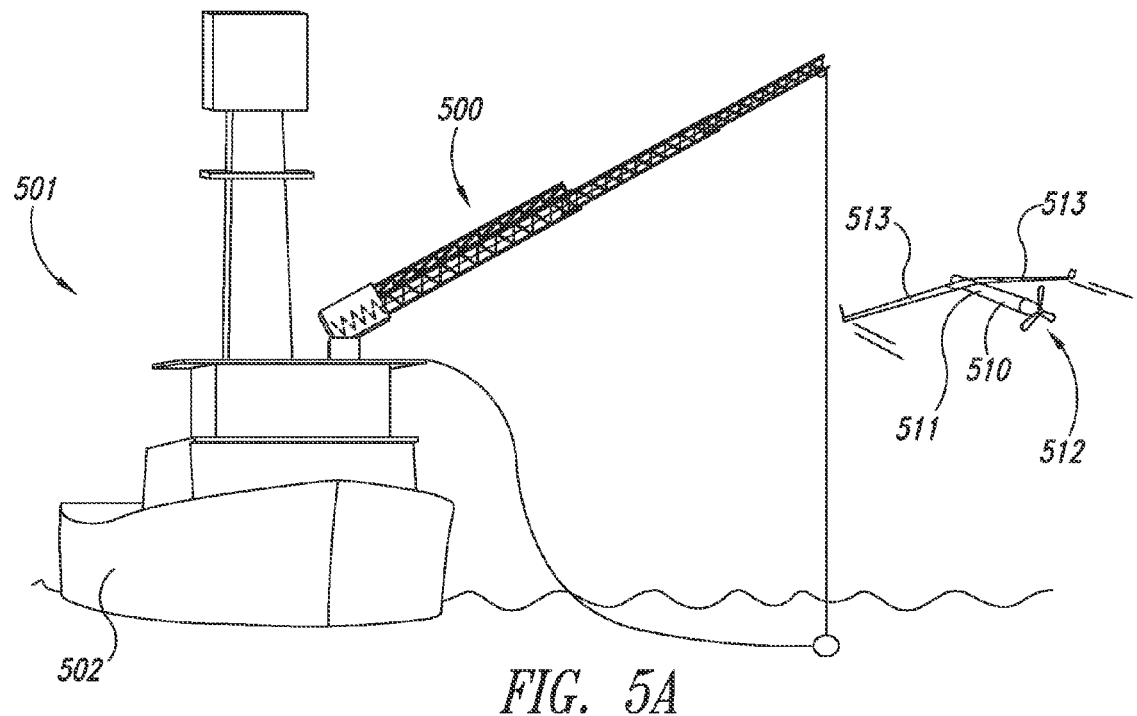
FIGS. 5A-5B illustrate overall views of apparatuses and methods for capturing unmanned aircraft in accordance with an embodiment of the disclosure.
Figure 5B:
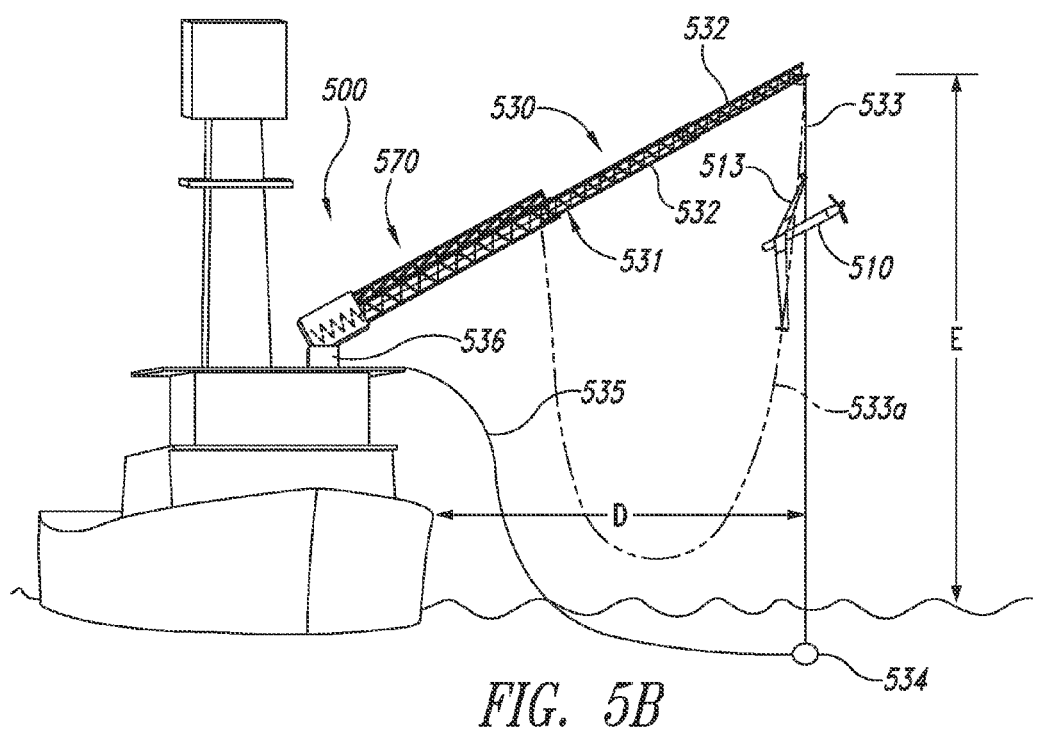

FIGS. 5A-5B illustrate overall views of representative apparatuses and methods for capturing unmanned aircraft in accordance with embodiments of the disclosure. Representative embodiments of aircraft launch and capture techniques are also disclosed in U.S. patent application Ser. No. 11/603,810, filed Nov. 21, 2006, entitled METHODS AND APPARATUSES FOR LAUNCHING UNMANNED AIRCRAFT, INCLUDING RELEASABLY GRIPPING AIRCRAFT DURING LAUNCH AND BREAKING SUBSEQUENT GRIP MOTION (now U.S. Pat. No. 7,712,702) and U.S. patent application Ser. No. 13/483,330, filed May 30, 2012, entitled LINE CAPTURE DEVICES FOR UNMANNED AIRCRAFT, AND ASSOCIATED SYSTEMS AND METHODS, each of which is herein incorporated by reference in its entirety. Beginning with FIG. 5A, a representative unmanned aircraft 510 can be captured by an aircraft handling system 500 positioned on a support platform 501. In one embodiment, the support platform 501 can include a boat, ship, or other water vessel 502. In other embodiments, the support platform 501 can include other structures, including a building, a truck or other land vehicle, or an airborne vehicle, such as a balloon. In many of these embodiments, the aircraft handling system 500 can be configured solely to retrieve the aircraft 510 or, in particular embodiments, it can be configured to both launch and retrieve the aircraft 510. The aircraft 510 can include a fuselage 511 and wings 513 (or a blended wing/fuselage), and is propelled by a propulsion system 512 (e.g., a piston-driven propeller).

Referring now to FIG. 5B, the aircraft handling system 500 can include a recovery system 530 integrated with a launch system 570. In one aspect of this embodiment, the recovery system 530 can include an extendable boom 531 having a plurality of segments 532. The boom 531 can be mounted on a rotatable base 536 or turret for ease of positioning. The segments 532 are initially stowed in a nested or telescoping arrangement and are then deployed to extend outwardly as shown in FIG. 5B. In other embodiments, the extendable boom 531 can have other arrangements, such as a scissors arrangement, a parallel linkage arrangement or a knuckle boom arrangement. In any of these embodiments, the extendable boom 531 can include a recovery line 533 extended by gravity or other forces. In one embodiment, the recovery line 533 can include 0.25 inch diameter polyester rope, and in other embodiments, the recovery line 533 can include other materials and/or can have other dimensions (e.g., a diameter of 0.3125 inch). In any of these embodiments, a spring or weight 534 at the end of the recovery line 533 can provide tension in the recovery line 533. The aircraft handling system 500 can also include a retrieval line 535 connected to the weight 534 to aid in retrieving and controlling the motion of the weight 534 after the aircraft recovery operation has been completed. In another embodiment, a different recovery line 533a (shown in dashed lines) can be suspended from one portion of the boom 531 and can attach to another point on the boom 531, in lieu of the recovery line 533 and the weight 534.

In one aspect of this embodiment, the end of the extendable boom 531 can be positioned at an elevation E above the local surface (e.g., the water shown in FIG. 5B), and a distance D away from the nearest vertical structure projecting from the local surface. In one aspect of this embodiment, the elevation E can be about 15 meters and the distance D can be about 10 meters. In other embodiments, E and D can have other values, depending upon the particular installation. For example, in one particular embodiment, the elevation E can be about 17 meters when the boom 531 is extended, and about 4 meters when the boom 531 is retracted. The distance D can be about 8 meters when the boom 531 is extended, and about 4 meters when the boom 531 is retracted. In a further particular aspect of this embodiment, the boom 531 can be configured to carry both a vertical load and a lateral load via the recovery line. For example, in one embodiment, the boom 531 can be configured to capture an aircraft 510 having a weight of about 30 pounds, and can be configured to withstand a side load of about 400 pounds, corresponding to the force of the impact between the aircraft 510 and the recovery line 533 with appropriate factors of safety.

Figure 6A:
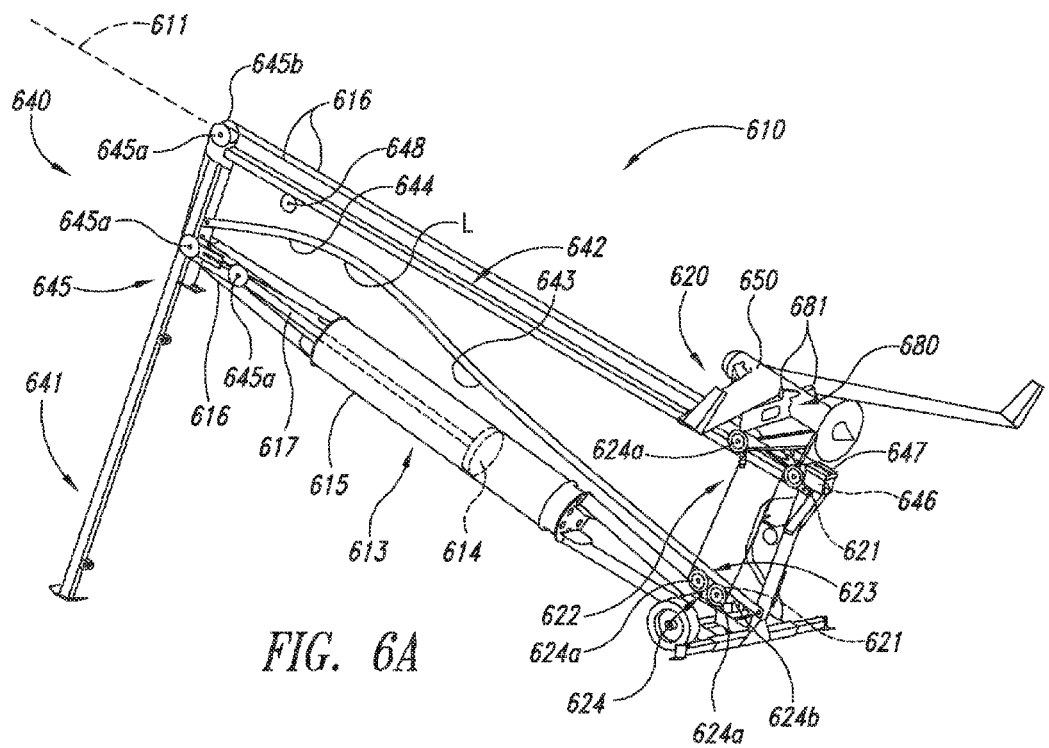
FIGS. 6A-6C illustrate an arrangement for launching an unmanned aircraft in accordance with an embodiment of the disclosure.

FIG. 6A illustrates a launch system 610 having a launch guide 640 and a carriage 620 that together accelerate and guide an aircraft 650 along an initial flight path 611 at the outset of a flight. The launch guide 640 can include a support structure 641 carrying a first or upper launch member 642 (e.g., a track) and a second or lower launch member 643, both of which are generally aligned with the initial flight path 611. The support structure 641 can be mounted to a vehicle (e.g., a trailer or a boat) or to a fixed platform (e.g., a building). Portions of the first launch member 642 and the second launch member 643 can be non-parallel to each other (e.g., they can converge in a direction aligned with the initial flight path 611) to accelerate the carriage 620, as described below.

The carriage 620 can include a gripper 680 having a pair of gripper arms 681 that releasably carry the aircraft 650. The carriage 620 can also include a first or upper portion 622 and a second or lower portion 623, each of which has rollers 621 (shown in hidden lines in FIG. 6A). The rollers 621 can guide the carriage 620 along the launch members 642, 643 while the carriage portions 622, 623 are driven toward each other. Accordingly, normal forces applied to the rollers 621 can drive the rollers 621 against the launch members 642, 643, drive the carriage portions 622, 623 together, and drive the carriage 620 forward, thereby accelerating the aircraft 650 to flight speed.

An actuator 613 can be linked to the carriage 620 to provide the squeezing force that drives the carriage portions 622, 623 toward each other and drives the carriage 620 along the launch guide 640. Many actuators 613 that are configured to release energy fast enough to launch the aircraft 650 also have a spring-like behavior. Accordingly, the actuators 613 tend to exert large forces at the beginning of a power stroke and smaller forces as the power stroke progresses and the carriage 620 moves along the launch guide 640. An embodiment of the system 610 shown in FIG. 6A can compensate for this spring-like behavior by having a relative angle between the first launch member 642 and the second launch member 643 that becomes progressively steeper in the launch direction. In one example, the force provided by the actuator 613 can decrease from 6000 lbs to 3000 lbs as the carriage 620 accelerates. Over the same distance, the relative slope between the first launch member 642 and the second launch member 643 can change from 6:1 to 3:1. Accordingly, the resulting thrust imparted to the carriage 620 and the aircraft 650 can remain at least approximately constant.

At or near a launch point L, the carriage 620 reaches the launch speed of the aircraft 650. The first launch member 642 and the second launch member 643 can diverge (instead of converge) forward of the launch point L to form a braking ramp 644. At the braking ramp 644, the carriage 620 rapidly decelerates to release the aircraft 650. The carriage 620 then stops and returns to a rest position at least proximate to or coincident with the launch position L.

In one embodiment, the actuator 613 includes a piston 614 that moves within a cylinder 615. The piston 614 is attached to a flexible, elongated transmission element 616 (e.g., a rope or cable) via a piston rod 617. The transmission element 616 can pass through a series of guide pulleys 645 (carried by the launch guide 640) and carriage pulleys 624 (carried by the carriage 620). The guide pulleys 645 can include first guide pulleys 645a on a first side of the support structure 641, and corresponding second guide pulleys 645b on a second (opposite) side of the support structure 641. The carriage pulleys 624 can also include first carriage pulleys 624a on a first side of the carriage 620 and second pulleys 624b on a second (opposite) side of the carriage 620. One or more equalizing pulleys 646, located in a housing 647 can be positioned between (a) the first guide pulleys 645a and the first carriage pulleys 624a on the first side of the support structure 641, and (b) the second guide pulleys 645b and the second carriage pulleys 624b on the second side of the support structure 641.

In operation, one end of the transmission element 616 can be attached to the first side of the support structure 641, laced through the first pulleys 645a, 624a, around the equalizing pulley(s) 646, and then through the second pulleys 645b, 624b. The opposite end of the transmission element 616 can be attached to the second side of the support structure 641.

The equalizing pulley(s) 646 can (a) guide the transmission element 616 from the first side of the support structure 641 to the second side of the support structure 641, and (b) equalize the tension in the transmission element 616 on the first side of the support structure 641 with that on the second side of the support structure 641.

When the transmission element 616 is tensioned, it squeezes the carriage portions 622, 623 together, forcing the carriage 620 along the converging launch members 642, 643. The carriage pulleys 624 and the rollers 621 (which can be coaxial with the carriage pulleys 624) are secured to the carriage 620 so that the carriage 620 rides freely along the initial flight path 611 of the aircraft 650 as the carriage portions 622, 623 move together.

Figure 6B:
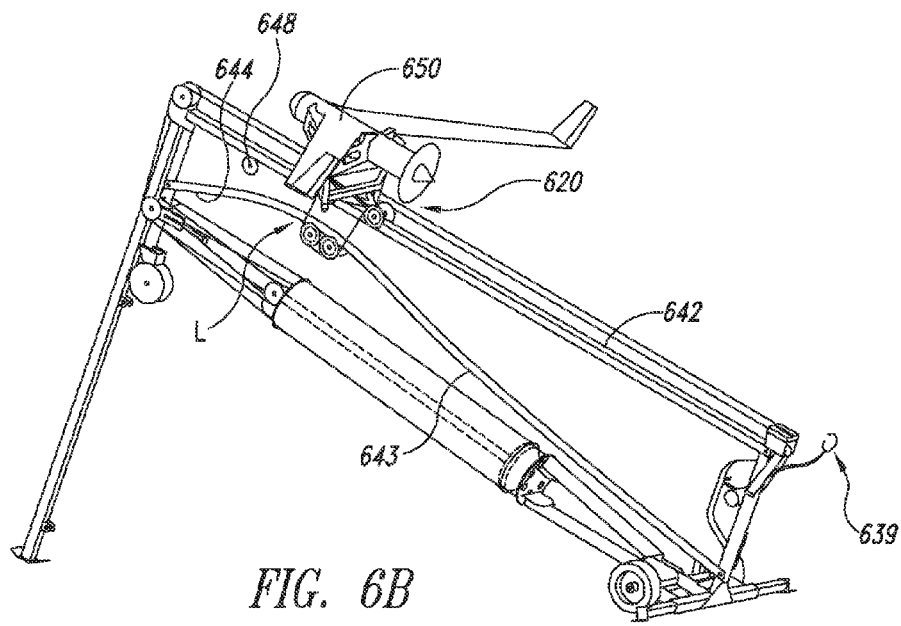

FIG. 6B illustrates the launch of the carriage 620 in accordance with an embodiment of the disclosure. The carriage 620 is held in place prior to launch by a trigger device 639, e.g., a restraining shackle. When the trigger device 639 is released, the carriage 620 accelerates along the launch members 642, 643, moving from a first launch carriage location to a second launch carriage location (e.g., to the launch point L). At the launch point L, the carriage 620 achieves its maximum velocity and begins to decelerate by rolling along the braking ramp 644. In this embodiment, one or more arresting pulleys 648 can be positioned along the braking ramp 644 to intercept the transmission element 616 and further decelerate the carriage 620.

Figure 6C:
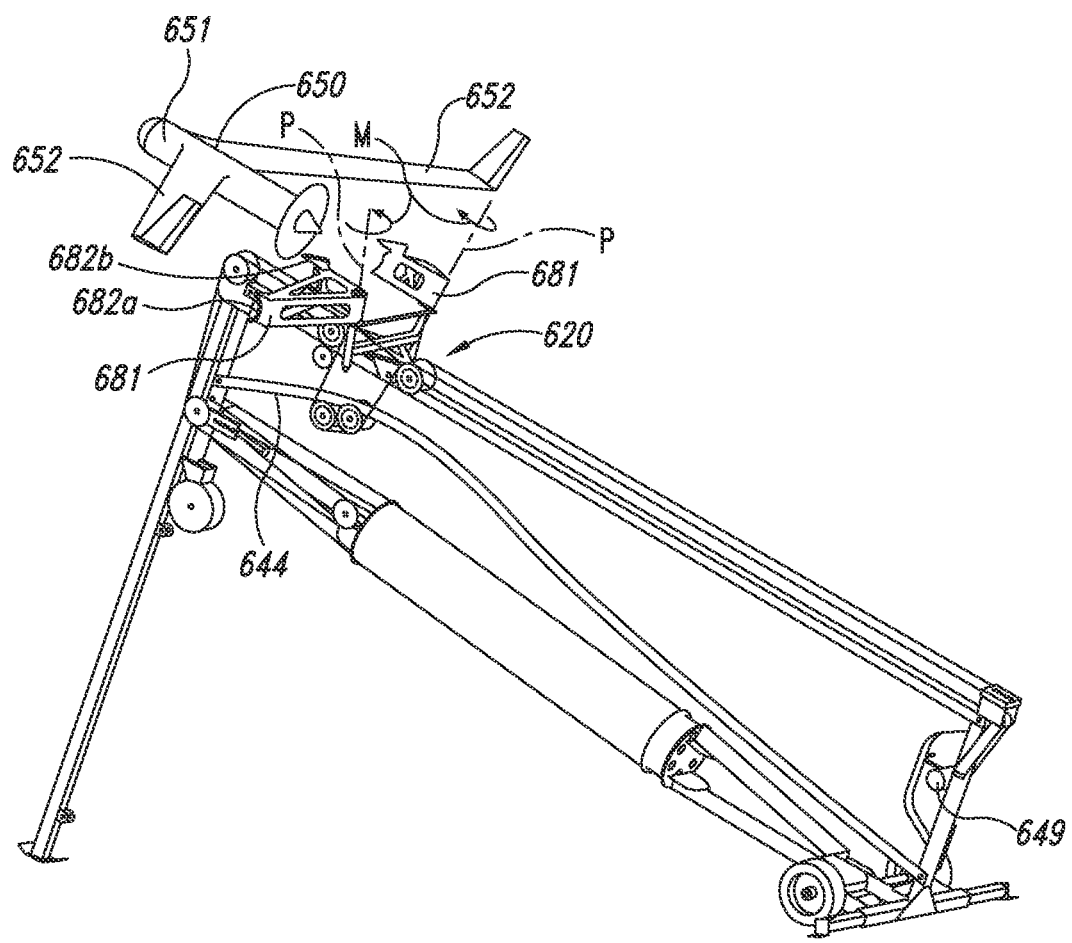

As shown in FIG. 6C, once the carriage 620 begins to decelerate along the braking ramp 644, the aircraft 650 is released by the gripper arms 681. Each gripper arm 681 can include a forward contact portion 682a and an aft contact portion 682b configured to releasably engage a fuselage 651 of the aircraft 650. Accordingly, each contact portion 682 can have a curved shape so as to conform to the curved shape of the fuselage 651. In other embodiments, the gripper arms 681 can engage different portions of the aircraft 650 (e.g., the wings 652). Each gripper arm 681 can be pivotably coupled to the carriage 620 to rotate about a pivot axis P. The gripper arms 681 can pivot about the pivot axes P to slightly over-center positions when engaged with the aircraft 650. Accordingly, the gripper arms 681 can securely grip the fuselage 651 and resist ambient windloads, gravity, propeller thrust (e.g., the maximum thrust provided to the aircraft 650), and other external transitory loads as the carriage 620 accelerates. In one aspect of this embodiment, each pivot axis P is canted outwardly away from the vertical. As described in greater detail below, this arrangement can prevent interference between the gripper arms 681 and the aircraft 650 as the aircraft 650 is launched.

At least a portion of the mass of the gripper arms 681 can be eccentric relative to the first axis P. As a result, when the carriage 620 decelerates, the forward momentum of the gripper arms 681 causes them to fling open by pivoting about the pivot axis P, as indicated by arrows M. The forward momentum of the gripper arms 681 can accordingly overcome the over-center action described above. As the gripper arms 681 begin to open, the contact portions 682a, 682b begin to disengage from the aircraft 650. In a particular aspect of this embodiment, the gripper arms 681 pivot downwardly and away from the aircraft 650.

From the foregoing, it will be appreciated that specific embodiments of the technology have been described herein for purposes of illustration, but that various modifications may be made without deviating from the disclosure. For example, the unmanned vehicle system can include additional components or features, and/or different combinations of the components or features described herein. While particular embodiments of the technology were described above in the context of ITAR, MTCR, and EAR regulations, other embodiments using generally similar technology can be used in the context of other regulations. Such regulations may vary from one jurisdiction (e.g., national or regional jurisdictions) to another. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method, performed by a computing system of an unmanned aerial vehicle, for ensuring that the unmanned aerial vehicle complies with specified export control requirements throughout the operation of the unmanned aerial vehicle, the method comprising:
    storing an indication of an initial specification of the unmanned aerial vehicle, the initial specification of the unmanned aerial vehicle specifying initial configuration information and an identification for each of a plurality of tamper-resistant trusted components of the unmanned aerial vehicle, wherein the initial configuration of the unmanned aerial vehicle is in compliance with the specified export control requirements and wherein at least one of the trusted components is configured to ensure that the range of the unmanned aerial vehicle does not exceed a predetermined distance;
    receiving a request to operate the unmanned aerial vehicle;
    in response to receiving the request to operate the unmanned aerial vehicle, for each of the plurality of trusted components of the unmanned aerial vehicle,
        querying the trusted component of the unmanned aerial vehicle for current configuration information, wherein communication with the trusted component of the unmanned aerial vehicle is encrypted,
        receiving an indication that the trusted component of the unmanned aerial vehicle is not present within the unmanned aerial vehicle or that the configuration of the trusted component of the unmanned aerial vehicle has been modified since the initial specification was stored, and
        in response to receiving the indication that the trusted component of the unmanned aerial vehicle is not present within the unmanned aerial vehicle or that the configuration of the trusted component of the unmanned aerial vehicle has been modified since the initial specification was stored, modifying the operation of the unmanned aerial vehicle;
    receiving an indication that the unmanned aerial vehicle is at least a predetermined distance from a launch location or that communication between the unmanned aerial vehicle and a control station has been lost; and
    in response to receiving the indication that the unmanned aerial vehicle is at least the predetermined distance from the launch location or that communication between the unmanned aerial vehicle and the control station has been lost, modifying a path of the unmanned aerial vehicle.

2. The method of claim 1 wherein at least one of the trusted components of the unmanned aerial vehicle is configured to ensure that a payload of the unmanned aerial vehicle cannot operate when the payload exceeds a predetermined weight.

3. The method of claim 1, further comprising:
receiving an indication that a speed of the unmanned aerial vehicle is in excess of a predetermined speed threshold; and
in response to receiving the indication that the speed of the unmanned aerial vehicle is in excess of the predetermined speed threshold, disabling a navigation system of the unmanned aerial vehicle.

4. The method of claim 1 wherein at least one of the trusted components of the unmanned aerial vehicle is configured to ensure that an altitude of the unmanned aerial vehicle exceeds a predetermined altitude threshold while the unmanned aerial vehicle is not taking off and not landing.

5. The method of claim 1 wherein modifying the operation of the unmanned aerial vehicle comprises disabling a launch of the unmanned aerial vehicle.

6. The method of claim 1 wherein modifying the operation of the unmanned aerial vehicle comprises executing a spin-stall maneuver.

7. The method of claim 1 wherein modifying the operation of the unmanned aerial vehicle comprises disabling a navigation system of the unmanned aerial vehicle.

8. An unmanned vehicle comprising:
a memory configured to store initial configuration information for each of a plurality of tamper-proof trusted components of the unmanned aerial vehicle having an initial configuration that is in compliance with specified export control requirements; and
a system verification component configured to, for each of the trusted components,
query the trusted component for current configuration information,
receive the current configuration information,
receive an indication that the current configuration information is different from the initial configuration information, and
disable the unmanned aerial vehicle in response to receiving an indication that the current configuration information is different from the initial configuration information.

9. The unmanned vehicle of claim 8 wherein at least one of the trusted components is configured to ensure that a range of the vehicle does not exceed a predetermined distance.

10. A computer-readable storage medium storing instructions that, if executed by a computing system, cause the computing system to perform operations comprising:
storing an indication of an initial specification of a vehicle that, at the time of an initial configuration, is in compliance with specified control requirements;
receiving a request to operate the vehicle; and
in response to receiving the request to operate the vehicle, for each of a plurality of trusted components of the vehicle,
querying the trusted component of the vehicle for current configuration information, wherein communication with the trusted component of the vehicle is encrypted,
receiving an indication that the trusted component of the vehicle is not present within the vehicle or that the configuration of the trusted component of the vehicle has been modified since the initial specification was stored, and
in response to receiving the indication that the trusted component of the vehicle is not present within the vehicle or that the configuration of the trusted component of the vehicle has been modified since the initial specification was stored, denying the request to operate the vehicle.

11. The computer-readable storage medium of claim 10 wherein at least one of the trusted components is configured to ensure that a range of the vehicle does not exceed a predetermined distance.

12. The computer-readable storage medium of claim 10, herein the operations further comprise:
in response to receiving the request to operate the vehicle, for each of the plurality of the trusted components of the vehicle,
receiving a command from a control station,
in response to receiving the command from the control station,
determining that the control station is not a trusted control station, and
ignoring the received command in response to determining that the control station is not a trusted control station, and
receiving an indication that the vehicle is at least a predetermined distance from a launch location, and
in response to receiving the indication that the vehicle is at least the predetermined distance from the launch location, modifying a path of the vehicle.

13. The computer-readable storage medium of claim 10, wherein the operations further comprise:
receiving a plurality of points, each point having an associated latitude and longitude;
identifying an area defined by the received plurality of points; and
preventing the vehicle from traveling outside of the area defined by the received plurality of points.

14. The computer-readable storage medium of claim 13, wherein the operations further comprise:
receiving an indication that the vehicle is within a predetermined distance from an edge of the area defined by the received plurality of points; and
in response to receiving the indication that the vehicle is within the predetermined distance from the edge of the area defined by the received plurality of points, broadcasting an emergency code.

15. The computer-readable storage medium of claim 14, wherein at least a first trusted component of the plurality of trusted components of the vehicle is a software module and wherein at least a second trusted component of the plurality of trusted components of the vehicle is a hardware module.

16. A method, performed by a computing system, for ensuring that an unmanned aerial vehicle complies with specified export control requirements throughout the operation of the unmanned aerial vehicle, the method comprising:
for each of a plurality of the export control requirements,
determining a threshold value associated with the export control requirement, and
installing a component on the unmanned aerial vehicle configured to ensure that the unmanned aerial vehicle cannot be operated when an attribute of the unmanned aerial vehicle violates the threshold value associated with the export control requirement.

17. The method of claim 16 wherein a first export control requirement has an associated threshold range value and wherein installing a component for the first export control requirement comprises installing a component configured to ensure that the unmanned aerial vehicle cannot be operated when the distance of the unmanned aerial vehicle from a launch point exceeds the threshold range value.

* * * * *

UNITED STATES PATENT AND TRADEMARK OFFICE
CERTIFICATE OF CORRECTION

| | | |
|---|---|---|
| PATENT NO. | : 9,266,610 B2 | Page 1 of 1 |
| APPLICATION NO. | : 14/278242 | |
| DATED | : February 23, 2016 | |
| INVENTOR(S) | : Jeffrey H. Knapp et al. | |

It is certified that error appears in the above-identified patent and that said Letters Patent is hereby corrected as shown below:

Claims

In column 18, line 9, in claim 12, delete "herein" and insert -- wherein --, therefor.

Signed and Sealed this
Tenth Day of May, 2016

Michelle K. Lee
*Director of the United States Patent and Trademark Office*